United States Patent Office 2,964,454
Patented Dec. 13, 1960

2,964,454

IMPROVEMENTS IN IRRADIATION POLYMERIZATION

Thomas W. Findley, La Grange, Ill., assignor to Swift & Company, Chicago, Ill., a corporation of Illinois No Drawing. Filed Aug. 31, 1956, Ser. No. 607,256

11 Claims. (Cl. 204—154)

This invention relates generally to insoluble infusible polymeric materials and a method for their preparation and more particularly to the preparation of novel solvent and heat resistant polymers of polyepoxides and resins compatible therewith.

Rigid resins because of their light weight, ease of fabrication and great strength are used industrially for many purposes. Currently, rigid resins are employed in the fabrication of pipes, as liners for reaction vessels, and as floor coverings. Polymeric materials intended for such uses must be resistant to the effect of solvents and in addition must not flow at high temperatures.

Unplasticized polyvinyl chloride which has been employed heretofore for the aforementioned purposes has a number of disadvantages not present in the rigid resin products of the present invention. A special grade of polyvinyl chloride is required in the formulation of rigid unplasticized resin, and temperature control is rather critical in the fabrication of the unplasticized rigid resin.

An object of this invention is to provide a method for producing novel rigid resin materials whereby the aforementioned disadvantages are avoided. Many other applications wherein resins are employed require that a certain amount of flexibility be exhibited by the resin. Resins used in coating wire for insulating purposes must be flexible. Resinous tubing used for medical purposes such as in intravenous feeding must be flexible and able to withstand sterilizing temperatures. Plastic garden hose must have favorable cold flow properties (resistance to stress at elevated temperatures) as well as good flexibility.

It is therefore another object of this invention to provide a method whereby flexible resinous materials having substantial insolubility and resistance to cold flow may be produced.

It has been reported previously (K. H. Sun, Modern Plastics, September 1954, pp. 141, 150), that properties of polymeric materials can be materially and permanently altered by exposure to high-energy ionizing radiations. While the passage of radiation through some polymeric materials produces a new and valuable composition, others are decomposed by such treatment and darken in color. Polymers such as the polyvinyl halides, cellulose and polyisobutylene are included among those which are subject to direct degradation when exposed to high-energy electrons.

A further object of this invention is the provision of a method whereby these polymers, which have reportedly been decomposed by electron irradiation, may be irradiated to form insoluble infusible products of desired flexibility.

Additional objects if not specifically set forth herein will be readily apparent to one skilled in the art from the following detailed description of the invention.

In accordance with the practice of the present invention, resin compositions having improved resistance to melting at high temperatures, and substantial insolubility in organic solvents, acids and alkalies are obtained by exposing a mixture of a polyepoxy compound containing more than one

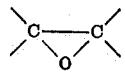

group and a resin compatible therewith to ionizing radiations in such a manner as to establish cross linking between polymer chains and convert the mixture into an insoluble infusible resin.

More specifically, the present invention comprises mixing a compound containing a plurality of epoxy groups, such as an epoxidized animal or vegetable fatty material, with a polymeric material such as a polyvinyl halide which is compatible with the epoxidized fatty material; shaping the flexible mixture into the form desired, and subjecting the formed mixture to ionizing radiation to produce an insoluble infusible resin.

Any of the known methods for formulating and mixing the components of the mixture may be employed. Films may be prepared from organosol or plastisol formulations or may be formed by solution casting. Products may also be formed and shaped by extrusion. In all of these techniques, the products of the present invention are fabricated at temperatures substantially lower than that required in the formation of objects from rigid unplasticized polyvinyl chloride.

The epoxy containing materials which may be used in preparing the novel resins of the present invention include epoxidized glycerides containing sufficient oxirane oxygen to be compatible with the thermoplastic resin. Epoxidized oleic-linoleic acid oils such as epoxidized safflower seed oil, and epoxidized soybean oil, and epoxidized linolenic acid oils such as epoxidized linseed oil are specific examples. The preferred epoxidized compounds may also be characterized as long chain fatty compositions having in excess of one epoxy group per molecule and derived from polyethenoid acids having a chain length of from 11 to 22 carbon atoms. Moreover, compounds of the bisphenol-epihalohydrin condensation product type are useful as the oxirane containing component.

The polymeric materials which are applicable in the manufacture of the resin products of the present invention include generally those polymers which are compatible with the epoxidized compositions mentioned previously. The vinyl halides such as polyvinyl chloride and polyvinylidene chloride as well as cellulose nitrate and other thermoplastic materials from which the polyepoxide will not bleed may be employed as the polymeric component. Although at ambient temperatures and in the absence of further treatment, the polyepoxy composition acts as a plasticizer for the thermoplastic component, the increased rigidity in the product after the cross-linking treatment is indicative of reaction between the resin and the polyepoxide.

It has been previously reported that the thermoplastic materials employed in the formulations of the present invention undergo direct degradation when exposed to high-energy ionizing radiations. It has now been found however, that the ionizations and excitations produced by the treatment of a polyepoxide-resin mixture with high-energy electrons results in the desirable products of this invention.

The type of electron source required is not critical since electronic ionizations and excitations are produced ultimately whatever the source of primary radiation. Requirements relating to the strength of the radiation field and the depth of penetration necessary for the particular object being treated will, however, determine the most appropriate source for a given purpose. The electron source used in the practice of the present invention is the General Electric electron generator operated at a potential of 800,000 electron volts for periods sufficient to produce doses up to 50 megareps. The rep, or roentgen equivalent physical, is that amount of radiation energy which produces an absorption of 83.8 ergs in 1 gram of water. Other radiation sources which may be used are beta-rays, X-rays and various types of linear accelerators as well as fission by-products or other sources of radioactivity producing gamma rays. The invention is further illustrated by the following examples in which the parts are by weight.

EXAMPLE

Compositions containing 60 parts polyvinyl chloride, 40 parts plasticizer, 3 parts stabilizer and 1 part lubricant were milled at 290–300° F. for 15 minutes to form flexible sheets of a thermoplastic resin formulation. Four formulations using different plasticizers were prepared. The plasticizers were:

A. Dioctyl phthalate.
B. Epoxidized soybean oil (prepared by the process disclosed in copending application Serial No. 437,876, filed June 18, 1954, one of the inventors therein being the inventor of the present invention).
C. Commercially available epoxidized soybean oil.
D. Epoxidized distilled acetylated monoglycerides of lard oil.

Sheets of the above formulations about .03 inch thick were cut to form 1 inch squares which were placed in the field of the electron generator. The electron beam having a predetermined beam current output was passed into the squares for periods sufficient to produce total irradiation dosages varying from 5 to 50 megareps. Air cooling of the films during irradiation prevented significant temperature increase in the films. Color, flexibility and resistance of the films to melting are given in the following tables. Table I shows the effect of the irradiation treatment on the softening temperature of the formulations. All samples were heated to around 250° C. to show melting behavior.

Table I

| Composition | Irradiation Level (Million rep.) | | | | |
|---|---|---|---|---|---|
| | 0 | 5 | 10 | 20 | 50 |
| Containing Plasticizer A | M | M | M | S | NM |
| Containing Plasticizer B | M | S | NM | NM | NM |
| Containing Plasticizer C | M | S | NM | NM | NM |

M=melts; S=softens; NM=does not melt.

The film prepared from the composition containing plasticizer D (monoepoxide) showed no stiffening even at the highest level of radiation. Some bleeding of the plasticizer from the resin started almost immediately. After standing for several months at room temperature, there was extensive bleeding of the monoepoxide plasticizer from the film, showing that the epoxidized composition must contain more than one epoxy group. Bleeding is not encountered when polyepoxides are employed in the composition as the plasticizer component.

Table II shows the general appearance and flexibility of the irradiated samples.

The irradiation treatment of plasticized thermoplastic materials as illustrated in this invention involves cross-linking within the plasticizer-polymer mixture to form the substantially insoluble infusible rigid products. Treatment of the epoxidized composition alone with ionizing radiations causes no polymerization at dosage levels usually sufficient to produce profound stiffening of the polyepoxide-polymer mixture. As has been reported previously, the thermoplastic materials per se undergo dehydrohalogenation and decomposition as a result of irradiation treatment. It is, therefore apparent, since neither the epoxide nor the thermoplastic material can be individually stiffened by ionizing radiations, that the mechanism involved in the stiffening process takes place through interaction of the components.

The effect of the polyepoxide in causing the cross-linking and imparting solvent, and melting resistance to the mixture is very substantial since only a very small proportion of epoxide to thermoplastic is required to accomplish the change. Depending on the extent of cross-linking desired in the final product, as little as 1.0% epoxide and as much as 50% of this material may be employed in the mixture with the polymer. At the lower level of 1.0% epoxide, a substantial decrease in solubility and increased resistance to melting and cold flow is achieved with a thermoplastic which otherwise becomes liquid on moderate heating.

In one embodiment of this invention the cross-linking produced by irradiation is employed to obtain substantial insolubility and infusibility while flexibility is adjusted by the addition of a plasticizer. Plasticizers suitable for this purpose include known vinyl plasticizers such as dioctyl phthalate, tricresyl phosphate and diisooctyl adipate. In accordance with this variation in the method, the total irradiation dosage necessary for substantial cross-linking, without darkening, of a particular polyepoxide-resin mixture is determined empirically. The flexibility of the mixture may then be adjusted by varying the quantity of plasticizer added.

In the formulation of the rigid and flexible heat and solvent resistant compositions described herein it is possible, of course, to incorporate fillers, pigments and other relatively inert materials as desired.

The depth of penetration is determined by the voltage of the source while the total dosage is dependent upon the beam output current and the time of treatment. Irradiation of thick objects requires a source capable of producing a high voltage to provide for complete penetration of the object. It is possible also to treat one face of the object and then other faces to obtain penetration of substantially all of the mass.

While an attempt has been made to set forth above an explanation of the mechanism involved in the reaction, the invention should not be limited thereby, since such explanations are given only in an attempt to further facilitate an understanding of the invention.

Obviously, many modifications and variations of the invention hereinbefore set forth may be made without departing from the spirit and scope thereof, and therefore only such limitations should be imposed as are indicated in the appended claims.

Table II

| Composition | Irradiation Level (Million rep.) | | | | |
|---|---|---|---|---|---|
| | 0 | 5 | 10 | 20 | 50 |
| Containing Plasticizer: | | | | | |
| A | | No change | Lt. Yellow | Brown | Dk. Brown, Incr. Flex. |
| B | | Lt. Yellow | Lt. Yellow, Slight Stiffening | Lt. Yellow, Very Stiff | Dk. Brown Very Stiff. |
| C | | do | do | do | Do. |
| D | | No color change—No stiffening | | | |

I claim:
1. A method for producing an insoluble infusible resin composition which comprises: subjecting a mixture of a polyepoxide composition and a thermoplastic resin selected from the group consisting of vinyl halide polymers and cellulose polymers to electron irradiation.
2. A method of treating a thermoplastic composition selected from the group consisting of vinyl halide polymers and cellulose polymers admixed with a compatible polyepoxidized fatty material to form a cross-linked resin which comprises: irradiating said thermoplastic with an amount of ionizing energy sufficient to convert said thermoplastic to a substantially insoluble infusible state.
3. A method for decreasing the flexibility of a mixture of a polyepoxide and a compatible thermoplastic resin selected from the group consisting of vinyl halide polymers and cellulose polymers to produce a cross-linked product which comprises: irradiating said mixture with a high energy electron beam sufficient to produce a total irradiation dosage of from about 5 to about 50 megareps.
4. A method of treating a flexible resin composition to produce an insoluble infusible product which comprises: subjecting a mixture of a polyepoxidized glyceride oil and a thermoplastic resin compatible therewith, said resin being a polyvinyl halide resin, to the ionizations and excitations produced by a high energy electron beam.
5. A method of treating a flexible resin composition to produce a rigid insoluble infusible product which comprises: subjecting a mixture of a polyepoxidized linoleic acid oil and a thermoplastic resin, said resins being selected from the group consisting of polyvinyl halide polymers and cellulose polymers compatible therewith to the ionizations and excitations produced by a high energy electron beam.
6. A method of treating a flexible resin composition to produce a rigid insoluble infusible product which comprises: subjecting a mixture of a polyepoxidized linolenic acid oil and a polyvinyl halide resin to the ionizations and excitations produced by a high energy electron beam.
7. A method for producing a cross-linked resin composition which comprises the steps of admixing a polyepoxy composition and a compatible thermoplastic resin selected from the group consisting of polyvinyl halide polymers and cellulose polymers, shaping the flexible mixture to the desired form and exposing said shaped mixture to a high energy electron beam sufficient to impart heat and solvent resistance to said resin.
8. In the irradiation of thermoplastic polymers which normally tend to darken and decompose upon being subjected to electron irradiation the improvement which comprises: incorporating in said polymer, said polymer being selected from the group consisting of polyvinyl halide polymers and cellulose polymers, prior to irradiation thereof from about 1.0% to about 50% based on the weight of the polymer of a composition containing in excess of one oxirane group per molecule.
9. In the irradiation of vinyl halide polymers which normally tend to darken and decompose upon being subjected to electron irradiation the improvement which comprises: incorporating in said polymer prior to irradiation thereof from about 1.0% to about 50% based on the weight of the polymer of a polyepoxidized glyceride.
10. A method for decreasing the flexibility of thermoplastic polymers selected from the group consisting of vinyl halide polymers and cellulose polymers, which comprises: incorporating in said polymer prior to irradiation thereof with high energy ionizing radiation from about 1% to about 50% based on the weight of said polymer of epoxidized soybean oil.
11. A method for decreasing the flexibility of a thermoplastic composition which normally tends to undergo degradation when treated with ionizing radiation which comprises: forming a mixture of a thermoplastic composition selected from the group consisting of vinyl halide polymers and cellulose polymers and a compatible polyepoxide composition and irradiating said mixture with an amount of ionizing energy sufficient to convert said thermoplastic to a substantially insoluble, infusible state.

References Cited in the file of this patent

UNITED STATES PATENTS

| 2,719,089 | Lovell | Sept. 27, 1955 |
| 2,766,220 | Kantor | Oct. 9, 1956 |

FOREIGN PATENTS

| 732,047 | Great Britain | June 15, 1955 |

OTHER REFERENCES

Taft: "Modern Plastics," pp. 170, 172, 174, 176, 246, 247, May 1957.

Schildknecht II: "Vinyl and Related Polymers," pp. 422–423, John Wiley & Sons, Inc., N.Y. (1952).

"I. & E. Chem.," vol. 45, pp. 11A and 13A, September 1953.

Charlesby: "Nucleonics," vol. 12, pp. 18–25, June 1954.

Major: "The Chemical Age," pp. 149–153, Jan. 8, 1955.

Schildknecht: "High Polymers," vol. X, Polymer Processes, pp. 730–732, 739 (1956), Interscience Publishers, Inc., N.Y.C.

AECD 3634, pp. 1–5, 7–10, 12, 16, 19 (1948), declassified April 22, 1955.

ORNL–928, pp. 1–26, 68–72, 179–183, 191, 196, June 29, 1951.

ORNL–1373, page 30, July 23, 1953.